United States Patent
Vandermey et al.

(10) Patent No.: US 8,847,151 B2
(45) Date of Patent: Sep. 30, 2014

(54) APPARATUS AND METHOD FOR COUPLING RF AND AC SIGNALS TO PROVIDE POWER TO A MULTIPOLE IN A MASS SPECTROMETER

(75) Inventors: John Vandermey, Georgetown (CA); Alexandre Loboda, Thornhill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 989 days.

(21) Appl. No.: 12/946,084

(22) Filed: Nov. 15, 2010

(65) Prior Publication Data

US 2011/0278917 A1 Nov. 17, 2011

Related U.S. Application Data

(60) Provisional application No. 61/261,413, filed on Nov. 16, 2009.

(51) Int. Cl.
 *H01J 49/02* (2006.01)
 *H01J 49/42* (2006.01)
 *H01F 19/04* (2006.01)

(52) U.S. Cl.
 CPC ....... *H01J 49/022* (2013.01); *H04B 2203/5483* (2013.01); *H01F 19/04* (2013.01); *H01J 49/422* (2013.01); *H04B 2203/5491* (2013.01)
 USPC ................................ 250/281; 307/3; 250/290

(58) Field of Classification Search
 CPC .............................. H01J 49/063; H01J 49/022
 USPC ............................................................. 307/3
 See application file for complete search history.

(56) References Cited

U.S. PATENT DOCUMENTS

| | | | |
|---|---|---|---|
| 4,540,884 A * | 9/1985 | Stafford et al. | 250/282 |
| 5,468,957 A | 11/1995 | Franzen | |
| 5,714,755 A | 2/1998 | Wells et al. | |
| 6,844,547 B2 * | 1/2005 | Syka | 250/292 |
| 7,456,388 B2 | 11/2008 | Loboda et al. | |

(Continued)

OTHER PUBLICATIONS

PCT Application No. PCT/CA2010/001825 International Search Report mailed Feb. 10, 2011.
PCT Application No. PCT/CA2010/001825 Written Opinion mailed Feb. 10, 2011.

(Continued)

*Primary Examiner* — Phillip A Johnston
*Assistant Examiner* — James Choi

(57) ABSTRACT

An apparatus and method for coupling RF and AC signals to provide power to a multipole in a mass spectrometer is provided. A first circuit comprises: an RF power source for providing difference mode power to the multipole via the RF signal; at least one inductor for forming at least one resonant LC circuit with the multipole for providing voltage gain for the RF signal; and a transformer, comprising a secondary tap, the transformer connected in parallel to the RF power source and further connected to the at least one inductor such that the signals injected into the secondary tap are communicated to the at least one resonant LC circuit. A second circuit comprises: an AC power source for providing common mode power to the multipole via the AC signal, an output from the second circuit connected to the secondary tap such that the common mode power is injected into the first circuit and the multipole can be operated in common mode and difference mode simultaneously; and at least one inductor for forming a resonant LC circuit with the multipole via the transformer, to provide voltage gain for the AC signal.

20 Claims, 6 Drawing Sheets

(56) References Cited

U.S. PATENT DOCUMENTS

| | | | |
|---|---|---|---|
| 2005/0190581 A1* | 9/2005 | Lipcsei et al. | 363/16 |
| 2005/0263696 A1* | 12/2005 | Wells | 250/282 |
| 2006/0016981 A1* | 1/2006 | Park | 250/288 |
| 2009/0014645 A1 | 1/2009 | Chernushevich et al. | |
| 2009/0127456 A1* | 5/2009 | Makarov et al. | 250/290 |
| 2011/0278450 A1* | 11/2011 | Loucks et al. | 250/290 |
| 2011/0278946 A1* | 11/2011 | Vandermey | 307/104 |

OTHER PUBLICATIONS

Quadrupole Mass Spectrometry and its Applications by Peter H. Dawson Figure 2.10 p. 20. Definitions of a and q parameters—eqns 2.19, 2.20 p. 13.

International Search Report from International Patent Application No. PCT/CA2010/001825, date of mailing Feb. 10, 2011.

International Preliminary Report on Patentability from International Patent Application No. PCT/CA2010/001825, date of issuance May 22, 2012.

* cited by examiner

APPARATUS AND METHOD FOR COUPLING RF AND AC SIGNALS TO PROVIDE POWER TO A MULTIPOLE IN A MASS SPECTROMETER

FIELD

The specification relates generally to mass spectrometers, and specifically to an apparatus and method for coupling RF and AC signals to provide power to a multipole in a mass spectrometer.

BACKGROUND

It is generally desirable to reduce duty cycle losses in a mass spectrometer system. One source of duty cycle losses is in waiting for ions of different mass to charge ratios (m/z), ejected from a multipole ion guide such as a quadrupole, to reach their destination, generally an entry point of a mass detector (e.g. a time of flight (ToF) detector). In general, ions with high m/z travel at slower speed than ions with a lower m/z. In orthogonal TOF instrument the duty cycle is limited by the repetition rate of the TOF extraction pulses which are in turn limited by the speed at which the heavy ions are travelling. If the repetition rate is increased beyond an optimal value heavier ions are not properly sampled and/or lost. This problem can be addressed by causing ions trapped in a quadrupole ion guide to be ejected in a desired sequence, for example in order of m/z ratio starting with heavier ions, such that they arrive at a desired location in space simultaneously, for example at the extraction region of the ToF detector, and with the same kinetic energy. Such a technique can be used in other applications, such as filling ion traps (e.g. FT-ICR traps, Orbitraps, and Quadrupole ion traps) In any event, it is known that such a solution can be provided by simultaneous application of both radio-frequency (RF) and alternating (AC) voltages to the quadrupole electrodes. However, circuits for simultaneous application of RF and AC currents to the quadrupole can be quite complex.

SUMMARY

A first aspect of the specification provides an apparatus for coupling RF and AC signals to provide power to a multipole in a mass spectrometer. The apparatus comprises a first circuit. The first circuit comprises: an RF power source for providing difference mode power to the multipole via the RF signal; at least one inductor for forming at least one resonant LC circuit with the multipole for providing voltage gain for the RF signal; and a transformer comprising a secondary tap, the transformer connected in parallel to the RF power source and further connected to the at least one inductor such that signals injected into the secondary tap are communicated to the at least one resonant LC circuit. The apparatus further comprises a second circuit. The second circuit comprises: an AC power source for providing common mode power to the multipole via the AC signal, an output from the second circuit connected to the secondary tap such that the common mode power is injected into the first circuit and the multipole can be operated in common mode and difference mode simultaneously; and at least one inductor for forming a resonant LC circuit with the multipole via the transformer, to provide voltage gain for the AC signal.

The apparatus can further comprise at least one waveform generator circuit, connected to the first circuit, for controlling an amplitude of the RF signal.

The apparatus can further comprise at least one waveform generator circuit, connected to the second circuit, for controlling an amplitude of the AC signal.

The second circuit can further comprise at least one of a transformer for providing voltage gain for the AC signal and at least one further inductor for forming at least one resonant LC circuit with the multipole for providing voltage gain for the AC signal.

The transformer of the first circuit can be enabled to provide further voltage gain for the RF signal.

The RF power sources can operate in a range of 1-10 MHz.

The AC power sources can operate in a range of 1-10 MHz.

Each of the RF power source and the AC power source can operate at substantially the same frequency. Each of the RF power source and the AC power source can operate at substantially the same frequency and with a predefined phase difference, such that the addition of each the RF signal and the AC signal results in an RF unbalance on the multipole, that is controllable by varying the phase and amplitude of the AC signal.

The multipole can comprise at least one of a quadrupole, a hexapole and an octopole.

A second aspect of the specification provides a method for coupling RF and AC signals to provide power to a multipole in a mass spectrometer. The method comprises operating a first circuit to produce the RF signal, the first circuit comprising: an RF power source for providing difference mode power to the multipole via the RF signal; at least one inductor for forming at least one resonant LC circuit with the multipole for providing voltage gain for the RF signal; and a transformer, comprising a secondary tap, the transformer connected in parallel to the RF power source and further connected to the at least one inductor such that signals injected into the secondary tap are communicated to the at least one resonant LC circuit. The method further comprises operating a second circuit to produce the AC signal, the second circuit comprising: an AC power source for providing common mode power to the multipole via the AC signal, an output from the second circuit connected to the secondary tap such that the common mode power is injected into the first circuit and the multipole can be operated in common mode and difference mode simultaneously; and at least one inductor for forming a resonant LC circuit with the multipole via the transformer, to provide voltage gain for the AC signal. The method further comprises injecting the common mode power into the first circuit via the secondary tap to operate the multipole in common mode and difference mode simultaneously.

The method can further comprise controlling an amplitude of the RF signal of the first circuit, via at least one waveform generator circuit.

The method can further comprise controlling an amplitude of the AC signal of the second circuit, via at least one waveform generator circuit.

The method can further comprise amplifying the AC signal via at least one of a transformer in the second circuit and at least one further inductor in the second circuit for forming at least one resonant LC circuit with the multipole.

The method can further comprise providing further voltage gain for the RF signal using the transformer in the first circuit.

The RF power sources can operate in a range of 1-10 MHz.

The AC power sources can operate in a range of 1-10 MHz.

The method can further comprise operating each of the RF power source and the AC power source at substantially the same frequency. The method can further comprise: operating each of the RF power source and the AC power at substantially the same frequency and with a predefined phase difference, such that the addition of each the RF signal and the AC signal results in an RF unbalance on the multipole, that is controllable by varying the phase and amplitude of the AC signal.

The multipole can comprise at least one of a quadrupole, a hexapole and an octopole.

BRIEF DESCRIPTIONS OF THE DRAWINGS

Embodiments are described with reference to the following figures, in which.

DETAILED DESCRIPTION OF THE EMBODIMENTS

Figure 1:
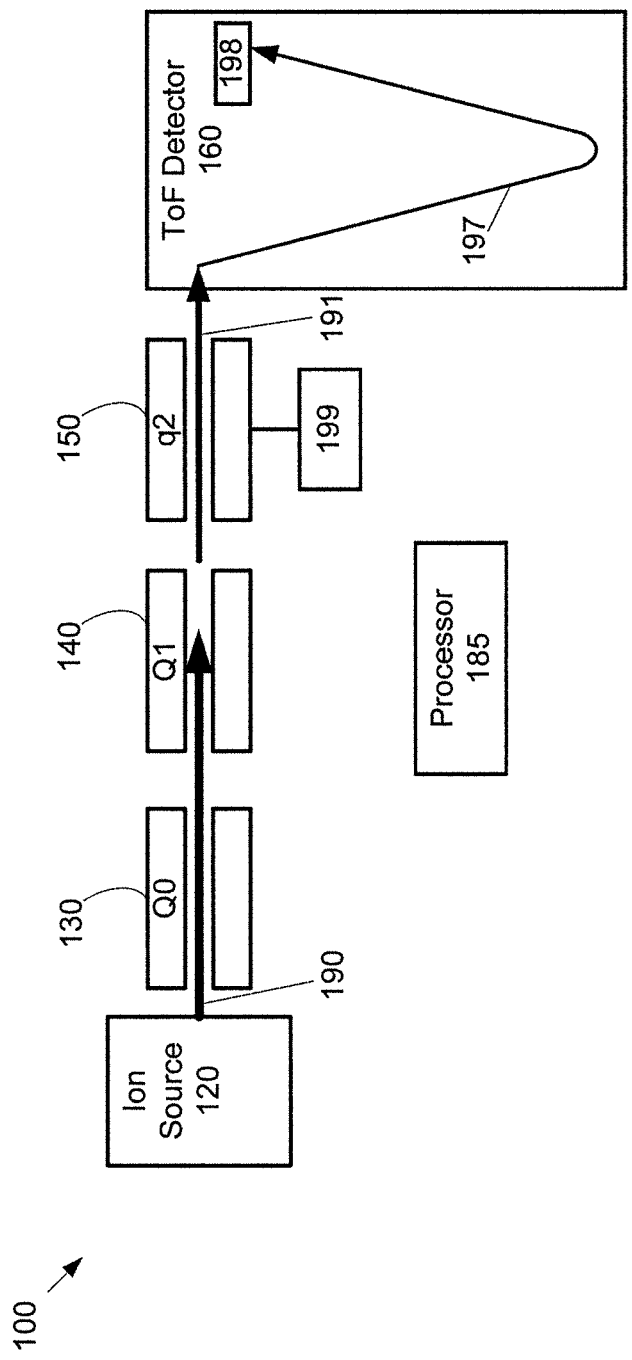
FIG. 1 depicts a mass spectrometer wherein at least one quadrupole can be controlled to eject ions in a desired sequence, according to non-limiting embodiments.

FIG. 1 depicts a mass spectrometer, the mass spectrometer comprising an ion guide 130, a quadrupole 140, a collision cell 150 (e.g. a fragmentation module) and a time of flight (ToF) detector 160, mass spectrometer 100 enabled to transmit an ion beam from ion source 120 through to ToF detector 160. In some embodiments, mass spectrometer 100 can further comprise a processor 185 for controlling operation of mass spectrometer 100, including but not limited to controlling ion source 120 to ionise the ionisable materials, and controlling transfer of ions between modules of mass spectrometer 100. In operation, ionisable materials are introduced into ion source 120. Ion source 120 generally ionises the ionisable materials to produce ions 190, in the form of an ion beam, which are transferred to ion guide 130 (also identified as Q0, indicative that ion guide 130 takes no part in the mass analysis). Ions 190 are transferred from ion guide 130 to quadrupole 140 (also identified as Q1), which can operate as a mass filter. Filtered or unfiltered ions then enter collision cell 150 also identified as q2 which can be controlled to eject ions 191 in a desired sequence, as described below. In some embodiments, ions 191 can be fragmented in collision cell 150. It is understood that collision cell 150 can comprise any suitable multipole, including but not limited to a quadrupole, a hexapole, and an octopole. Ions 191 are then transferred to ToF detector 160 for production of mass spectra. In doing so, ions 191 follow a path 197 through ToF detector 160 and impinge on a suitable detector surface 198, the time of flight it takes to travel path 197 being proportional to the square root of the mass to charge ratio of an ion. In some embodiments, collision cell 150 comprises a quadrupole, mechanically similar to quadrupole 140.

Furthermore, while not depicted, mass spectrometer 100 can comprise any suitable number of vacuum pumps to provide a suitable vacuum in ion source 120, ion guide 130, quadrupole mass filter 140, collision cell 150 and/or ToF detector 160. It is understood that in some embodiments a vacuum differential can be created between certain elements of mass spectrometer 100: for example a vacuum differential is generally applied between ion source 120 and ion guide 130, such that ion source 120 is at atmospheric pressure and ion guide 130 is under vacuum. While also not depicted, mass spectrometer 100 can further comprise any suitable number of connectors, power sources, RF (radio-frequency) power sources, DC (direct current) power sources, gas sources (e.g. for ion source 120 and/or collision cell 150), and any other suitable components for enabling operation of mass spectrometer 100.

In particular mass spectrometer comprises an apparatus 199 for coupling RF and AC signals to provide power to a quadrupole in mass spectrometer 100, and specifically for providing power to collision cell 150. Apparatus 199 enables a quadrupole, such as collision cell 150, to be controlled to eject ions 191 in a desired sequence: for example in order of m/z ratio with heaviest ions (i.e. ions with a high m/z ratio) ejected first and lightest ions (i.e. ions with a low m/z ratio) ejected last. In depicted embodiments, apparatus 199 is connected to collision cell 150 such that fragmented ions are ejected in order of m/z ratio, and so that fragmented ions reach ToF detector 160 at substantially the same time.

Figure 2:
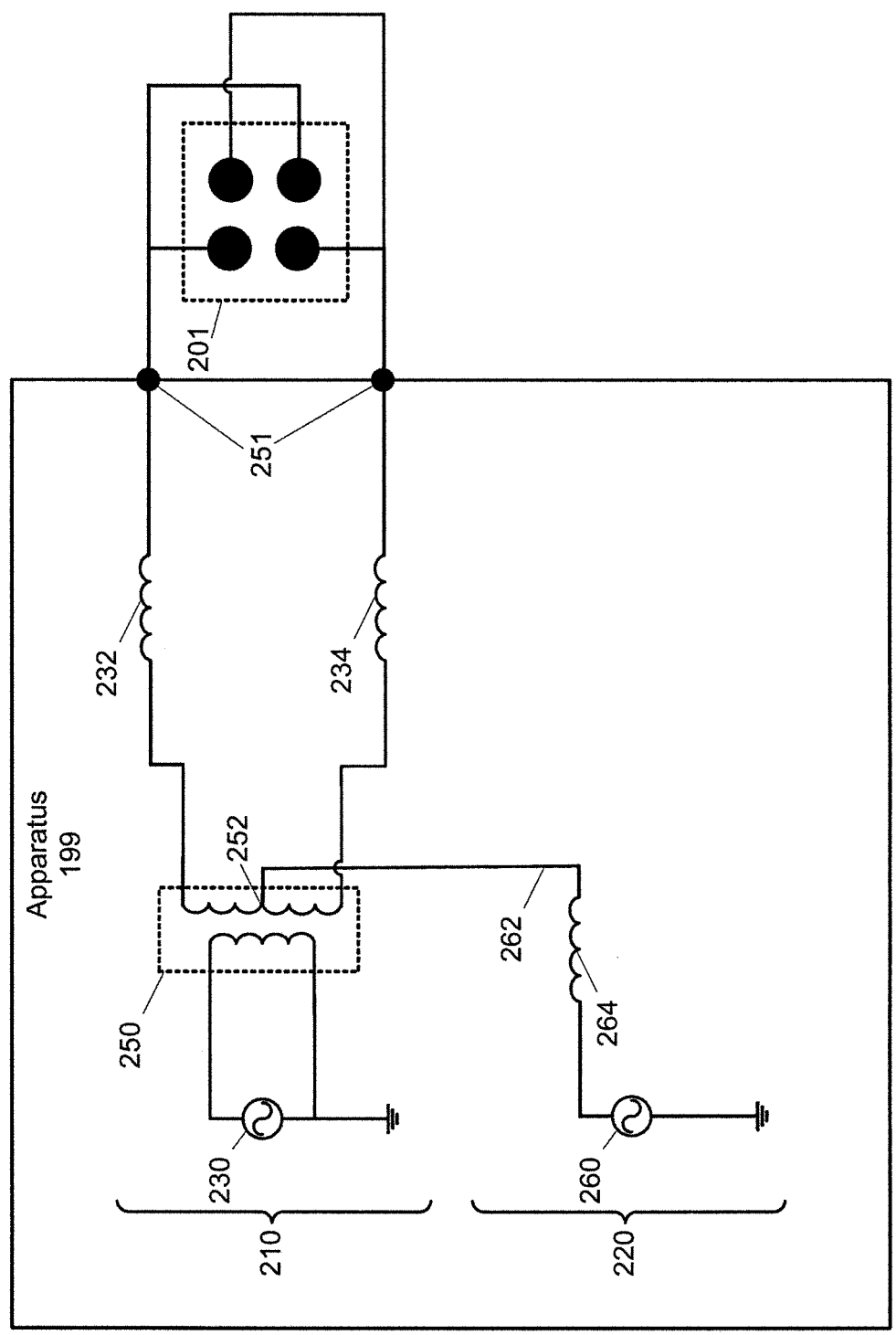
FIG. 2 depicts a schematic diagram of circuitry of an apparatus for coupling RF and AC signals to provide power to a quadrupole in a mass spectrometer, according to non-limiting embodiments.
Figure 3:
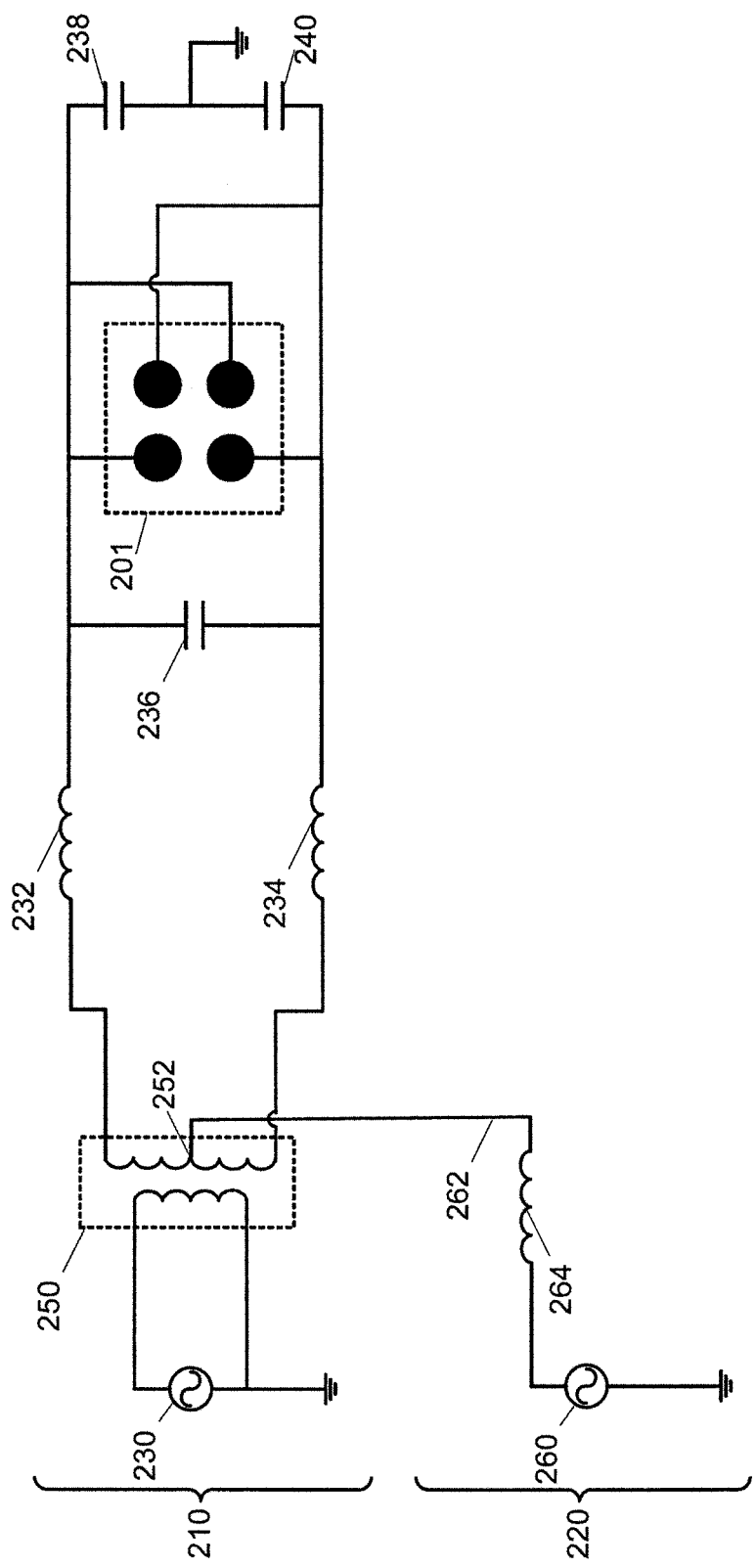
FIG. 3 depicts a schematic diagram of circuitry of an apparatus of FIG. 2, including capacitances introduced into the circuitry due to the quadrupole, according to non-limiting embodiments.

FIG. 2 depicts apparatus 199 for coupling RF and AC signals to provide power to a quadrupole 201 (shown in cross section) in a mass spectrometer, such as mass spectrometer 100. Furthermore, FIG. 3 depicts a schematic block diagram of apparatus 199, including equivalent capacitances introduced into the various circuits of apparatus 199 supplying RF and AC voltages to quadrupole 201. For example, in some embodiments, collision cell 150 can comprise quadrupole 201. However, quadrupole 201 is understood to be merely exemplary and in other embodiments, apparatus 199 can provide power to any suitable multipole in a mass spectrometer (including but not limited to a quadrupole, hexapole and octopole) which features two sets of interconnected electrodes connected with apparatus 199. For example, multipole ion guides are commonly powered in a manner similar to quadrupoles, with two sets of electrodes, for example, an "A" set and a "B" set. Voltages on such A and B sets are similar to voltages on cross-connected electrode pairs in a quadrupole. For example, in embodiments where a multipole comprises a hexapole, each of the A and B sets comprise three electrodes in each set, with each electrode in set A paired with an electrode from set B. Hence, quadrupole 201 is understood to be merely a non-limiting example of a type of a multipole, and in other embodiments, any suitable multipole can be controlled by apparatus 199 to eject ions in a desired sequence.

In any event, by coupling both an RF and AC signal to quadrupole 201, quadrupole 201 can be controlled to eject ions in order of m/z ratio. For example, a system where a quadrupole is controlled to eject ions in order of m/z ratio is described in U.S. Pat. No. 7,456,388, incorporated herein by reference. In general it is understood that the RF signal provides difference mode power to the poles (e.g. electrodes) of quadrupole 201 and the AC signal provides common mode power to the poles of quadrupole 201. It is understood that common mode power comprises a mode whereby all poles of quadrupole 201 are operated with a common AC signal.

In general, apparatus 199 comprises a first circuit 210 and a second circuit 220. First circuit 210 comprises an RF power source 230 for providing difference mode power to quadrupole 201 via the RF signal. First circuit 210 further comprises at least one inductor 232, 234 for forming at least one resonant LC circuit with quadrupole 201 for providing voltage gain for RF signal from RF power source 230. For example, and with reference to FIG. 3, at least one inductor 232, 234 forms a resonant LC circuit with a pole to pole capacitance 236 of quadrupole 201. As further depicted in FIG. 3, quadrupole 201 further introduces pole to ground capacitances 238, 240 into first circuit 220, when apparatus is connected with quadrupole 201. In other embodiments, as described below with reference to FIG. 4, apparatus 199 can further comprise at least one LC circuit for providing further voltage gain for RF signal from RF power source 230.

First circuit further comprises a transformer 250, transformer 250 comprising a secondary tap 252. Transformer 250 is connected in parallel to RF power source 230 and further connected to at least one inductor 232, 234, such that signals injected into secondary tap 252 are communicated to the resonant LC circuit formed by at least one inductor 232, 234 and capacitance 236. In some embodiments, transformer 250 is enabled to provide further voltage gain for the RF signal from RF power source 230. For example, transformer 250 is connected in parallel with RF power source 230 to step up (or step down, as desired) the RF signal from RF power source 230.

In some embodiments, apparatus 199 can comprise any suitable number of connectors 251 for connection to quadrupole 201. It is understood that each opposing pair of poles in quadrupole 201 is connected to a respective connector 251. While in depicted embodiments, apparatus 199 comprises two connectors 251, in alternative embodiments, apparatus 250 can comprise four connectors, one for each pole in quadrupole 201, with suitable internal wiring in apparatus 199 for placing a similar RF power signal on opposing pairs of poles in quadrupole 201.

Second circuit 220 comprises an AC power source 260 for providing common mode power to quadrupole 201 via the AC signal from AC power source 260. An output 262 from second circuit 220 is connected to secondary tap 252 of transformer 250, such that common mode power (i.e. the output from second circuit 220) is injected into first circuit 210. Hence, quadrupole 201 can be operated in common mode and difference mode simultaneously. It is understood that difference mode power comprises a mode whereby opposing poles of quadrupole 201 are operated with an RF signal where the polarity of the RF signal on one pair of poles is opposite to the polarity on the other pair of poles.

Second circuit 220 further comprises at least one inductor 264, forming a resonant LC circuit with quadrupole 201 via transformer 250, to provide voltage gain for the AC signal from AC power source 260.

In some embodiments, RF power source 230 operates in a range of 1-10 MHz. In some embodiments, AC power source 260 operates in a range of 1-10 MHz. In yet further embodiments, each of RF power source 230 and AC power source 260 operates at substantially the same frequency. In some of these embodiments, each of RF power source 230 and AC power source 260 operates at substantially the same frequency and a substantially constant phase shift, such that the addition of the RF signal from RF power source 230 and the AC signal from AC power source 260 results in an RF unbalance on quadrupole 201, the RF unbalance being controllable by varying the phase and amplitude of the AC signal. In general, however, it is understood that each of RF power source 230 and AC power source 260 can be operated at any suitable frequency, amplitude and phase to control quadrupole 201 to eject ions in desired sequence, for example from heaviest ions to lightest ions (i.e. highest m/z ration to lowest m/z ratio).

In general it is understood that circuits 210 and 220 can be modelled using any suitable circuit modelling package. Furthermore, in some embodiments, inductors 232, 234 can each have a value in the range of a few μH to tens of μH, while inductor 264 can have a value in the range of tens of μH to hundreds of μH. In these embodiments, the capacitance of quadrupole 201 (e.g. capacitance 236) can be in the range of ten to a hundred pF. Furthermore, transformer 250 can have any suitable combination of range of resistances and inductances; in non-limiting embodiments, the inductance of each of the primary side and secondary sides is in the range of a thousand μH. However, the exemplary ranges of the elements of circuits 210 and 220 are not be considered unduly limiting and indeed any suitable combination of ranges of resistances, inductances and capacitances are within the scope of present embodiments.

Figure 4:
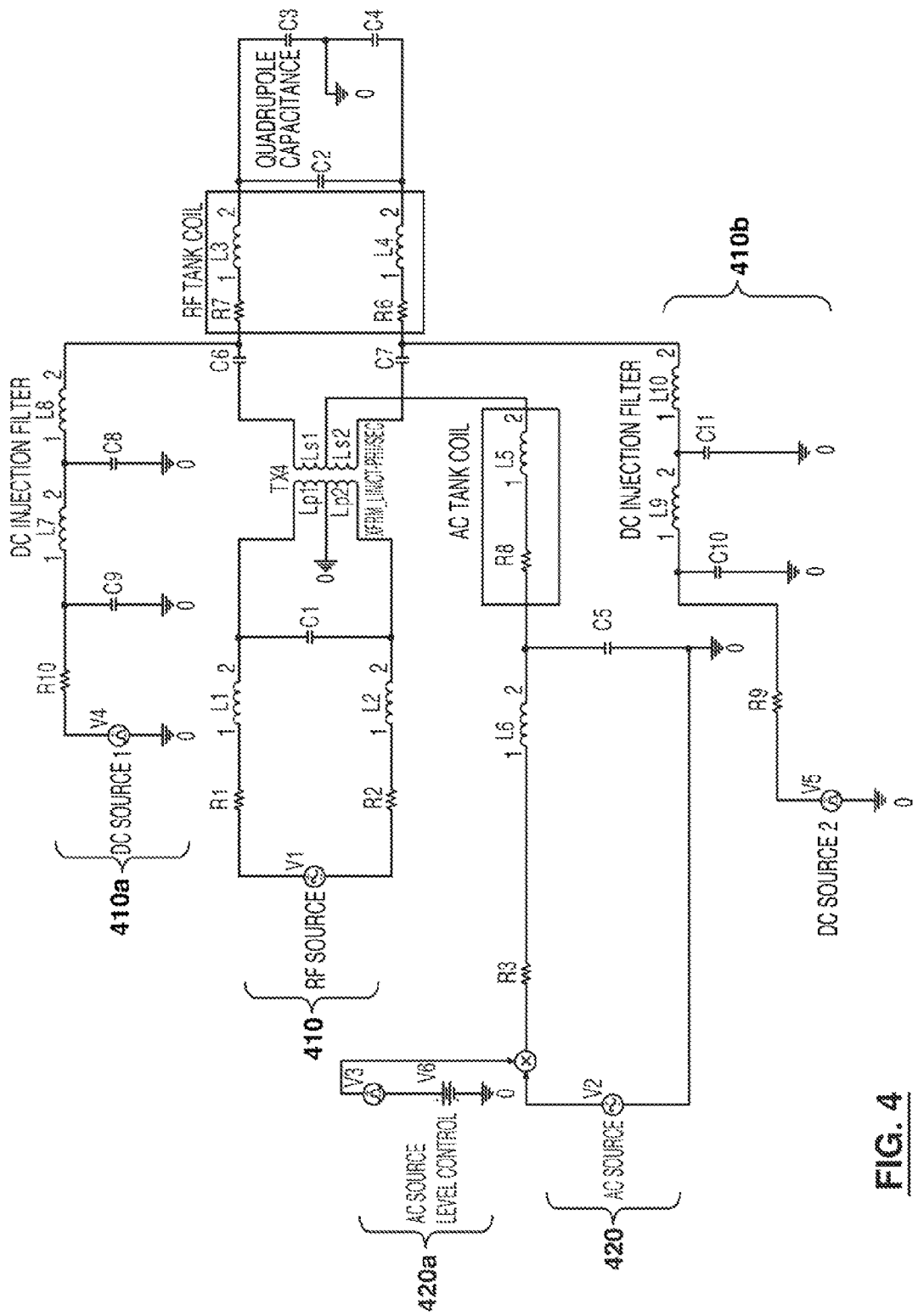
FIG. 4 depicts a schematic diagram of circuitry of an apparatus for coupling RF and AC signals to provide power to a quadrupole in a mass spectrometer, according to non-limiting embodiments.

Attention is now directed to FIG. 4, which depicts alternative embodiments of circuitry 400 of apparatus 199, according to non-limiting embodiments, along with equivalent capacitances/resistances introduced into the circuitry of apparatus 199 when connected to a quadrupole.

Specifically, circuitry 400 comprises a first circuit 410 enabled to provide an RF signal to a quadrupole, not depicted, but represented by capacitance C2. First circuit 410 comprises an RF power source V1, and inductors L1, L2, and a capacitor C1, forming a first resonant LC circuit for providing gain to an RF signal from RF power source V1, along with resistors R1, R2. The first resonant LC circuit is connected in cascade to a primary winding of transformer TX4 for providing further gain to the RF signal from RF power source V1. The secondary winding of transformer TX4 is connected to capacitors C6, C7, resistors R6, R7, and inductors L3, L4 which, with a pole to pole quadrupole capacitance of C2, form another LC circuit for providing gain to the RF signal from RF power source V1. Indeed, L3 with R7, and L4 with R6, each represent an RF tank coil circuit. Pole to ground capacitances C3, C4 of the quadrupole are also depicted. In general, it is understood that first circuit 410 provides difference mode power to the quadrupole, with the various LC circuits and transformer TX4 providing gain for the RF signal from RF power source V1.

It is further understood that capacitors C1, C6, C7, inductors L1, L2, L3, L4, and resistors R1, R2, R6, R7 can be of any suitable value, and can be determined via any suitable circuit modeling program, similar to circuits 210 as described above. In non-limiting exemplary embodiments, resistances R1, R2, R6, R7 are each in a range on the order of 0.1 ohms to a few ohms, capacitance C1 is in a range on the order of several thousand pF, capacitances C6, C7 are each in a range on the order of several nF, capacitances C3, C4 are each in a range on the order of tens of pF, inductors L1, L2 are each in a range on the order of tens of nH to several hundred nHs, and inductors L3, L4 are each in a range on the order of tens to hundreds of μHs. However, the exemplary ranges of the elements of circuit 400 are not be considered unduly limiting and indeed any suitable combination of ranges of resistances, inductances and capacitances are within the scope of present embodiments.

Circuitry 400, of apparatus 199, can further comprise at least one circuit 410a, 410b for providing further control of the RF signal from RF power source V1, connected to first circuit 410. Each circuit 410a, 410b comprises suitable respective pulse generators V4, V5, respective resistors R10, R9, inductors L7, L8, L9, L10, and capacitors C8, C9, C10, C11, as depicted, arranged to provide suitable impedance matching to first circuit 410. It is understood that each of circuits 410a, 401b is connected to first circuit 410 on a quadrupole side of transformer TX4. It is understood that each circuits 410a, 410b can be operated to control the amplitude of the RF signal from RF power source V1. It is further understood that resistors R10, R9, inductors L7, L8, L9, L10, and capacitors C8, C9, C10, C11 can be of any suitable value, and can be determined via any suitable circuit modeling program. In non-limiting exemplary embodiments, resistances R9, R10 are each in a range on the order of thousands of kilo-ohms, capacitances C8, C9, C10, C11 are each in a range on the order of several nFs, and inductors L7, L8, L9, L10 are each in a range on the order of tens of mH to several hundred mHs. However, the exemplary ranges of the elements of circuit 400 are not be considered unduly limiting and indeed any suitable combination of ranges of resistances, inductances and capacitances are within the scope of present embodiments.

Circuitry 400, of apparatus 199, further comprises a second circuit 420 enabled to provide an AC signal to the quadrupole. In depicted non-limiting exemplary embodiments, second circuit 420 can comprises an AC power source V2, a resistor R3, and an inductor L6. Second circuit 420 further comprises a resistor R8 and an inductor L8, representative of an AC tank coil, which form another LC circuit with pole to ground capacitance of C3 and C4 of the quadrupole, the output of circuit 420 being connected to the secondary tap of transformer TX4, similar to output 262 of second circuit 220 connected to secondary tap 252 of transformer 250 described above. In general, it is understood that second circuit 420 provides common mode power to the quadrupole, with the various LC circuits providing gain for the AC signal from AC power source V2. It is further understood that capacitor C3, inductors L5, L6, and resistors R3, R8 can be of any suitable value, and can be determined via any suitable circuit modeling program.

In some embodiments, second circuit 420 can further comprise at least one suitable transformer for providing additional voltage gain to the AC signal from AC power source V2, one end of the at least one suitable transformer connected to any suitable point between R3 and L6, and the other end to ground.

Circuitry 400 can further comprise at least one circuit 420a, connected to second circuit 420, for providing further control of the AC signal from AC power source V2. Circuit 420a can comprise at least one of a waveform generator V3 and a DC-source V6. Waveform generator V3 can control the variation of the envelope of the AC signal, while DC-source V6 can add a constant envelope to the AC signal. Circuit 420a is connected to second circuit 420 at any suitable point, for example to an output of AC power source V2 via a signal mixer.

Figure 5:
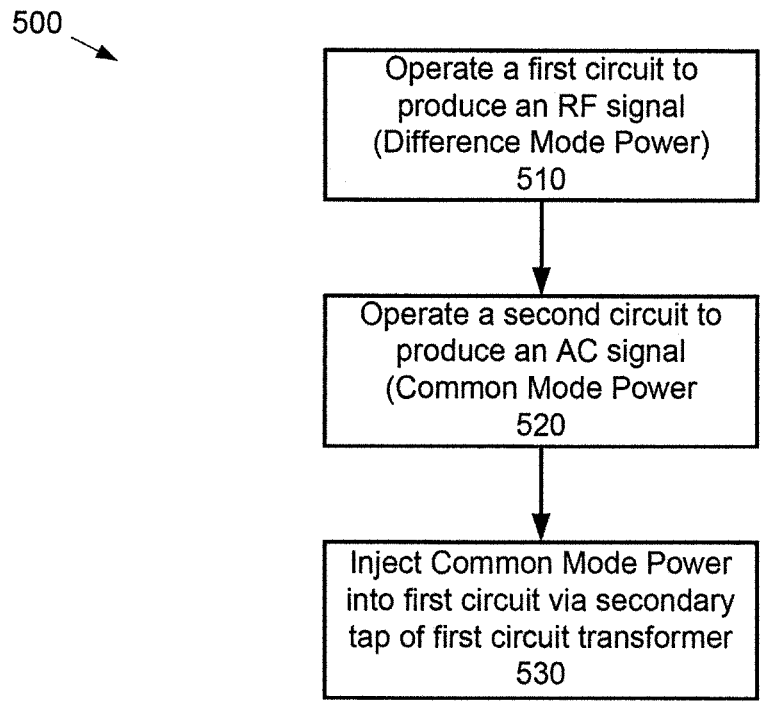
FIG. 5 depicts a method for coupling RF and AC signals to provide power to a quadrupole in a mass spectrometer, according to non-limiting embodiments.

Attention is now directed to FIG. 5 which depicts a method 500 for coupling RF and AC signals to provide power to a quadrupole in a mass spectrometer. In order to assist in the explanation of method 500, it will be assumed that method 500 is performed using apparatus 199. Furthermore, the following discussion of the method 500 will lead to a further understanding of the system 100 and its various components. However, it is to be understood that the system 100 and/or method 500 can be varied, and need not work exactly as discussed herein in conjunction with each other, and that such variations are within the scope of present embodiments.

At step 510, first circuit 210, 410 is operated to produce an RF signal, first circuit 210, 410 comprising: an RF power source 230, V1 for providing difference mode power to a quadrupole, such as quadrupole 210, via the RF signal; at least inductor 232, 234, L3, L4 for forming at least one resonant LC circuit with the quadrupole for providing voltage gain for the AC signal; and a transformer 250, TX4, comprising a secondary tap 252, transformer 250, TX4 providing further voltage gain for the RF signal.

At step 520, second circuit 220, 420 is operated to produce an AC signal, second circuit 220, 420 comprising: an AC power source 260, V2 for providing common mode power to the quadrupole via the AC signal, an output 262 from the second circuit connected to the secondary tap 252; and at least one inductor 264, L5 for forming a resonant LC circuit with the quadrupole via transformer 250, TX4, to provide voltage gain for the AC signal.

At step 530, common mode power from second circuit 220, 420 is injected into first circuit 210, 410 via secondary tap 252 to operate the quadrupole in common mode and difference mode simultaneously.

In general it is understood that steps 510-530 can be performed in parallel such that the quadrupole, such as quadrupole 201, is operated to eject ions in a desired sequence.

Furthermore, it is understood that each of RF power source 230, V1 and AC power source 260, V2 can be operated at any suitable frequency, amplitude and phase. 14. In some embodiments, RF power source 230, V1 is operated in a range of 1-10 MHz. In other embodiments, AC power source 260, V2 is operated in a range of 1-10 MHz. In yet further embodiments, each of RF power source 230, V1 and AC power source 260, V2 is operated at substantially the same frequency. In some of these embodiments, method 500 further comprises: operating each of RF power source 230 and AC power source 260 at substantially the same frequency and a constant phase difference (for example a constant pre-defined phase difference), such that the addition of each the RF signal and the AC signal results in an RF unbalance on the quadrupole; and controlling the RF unbalance by varying the phase and amplitude of the AC signal. The constant phase difference can be determined using any suitable circuit modelling software and/or by controlling the phase difference between RF power source 230 and AC power source 260 in a provisioning process until a desired RF unbalance is achieved, and then setting the constant phase difference to the phase difference between RF power source 230 and AC power source 260 at the desired RF unbalance.

Method 500 can further comprise providing a DC offset to the RF signal via at least one DC offset circuit 410a, 410b. Method 500 can further comprise providing a DC offset to the AC signal via a DC offset circuit 420a.

Method 500 can further comprise amplifying the AC signal via a transformer TX3 in second circuit 220, 420.

Figure 6:
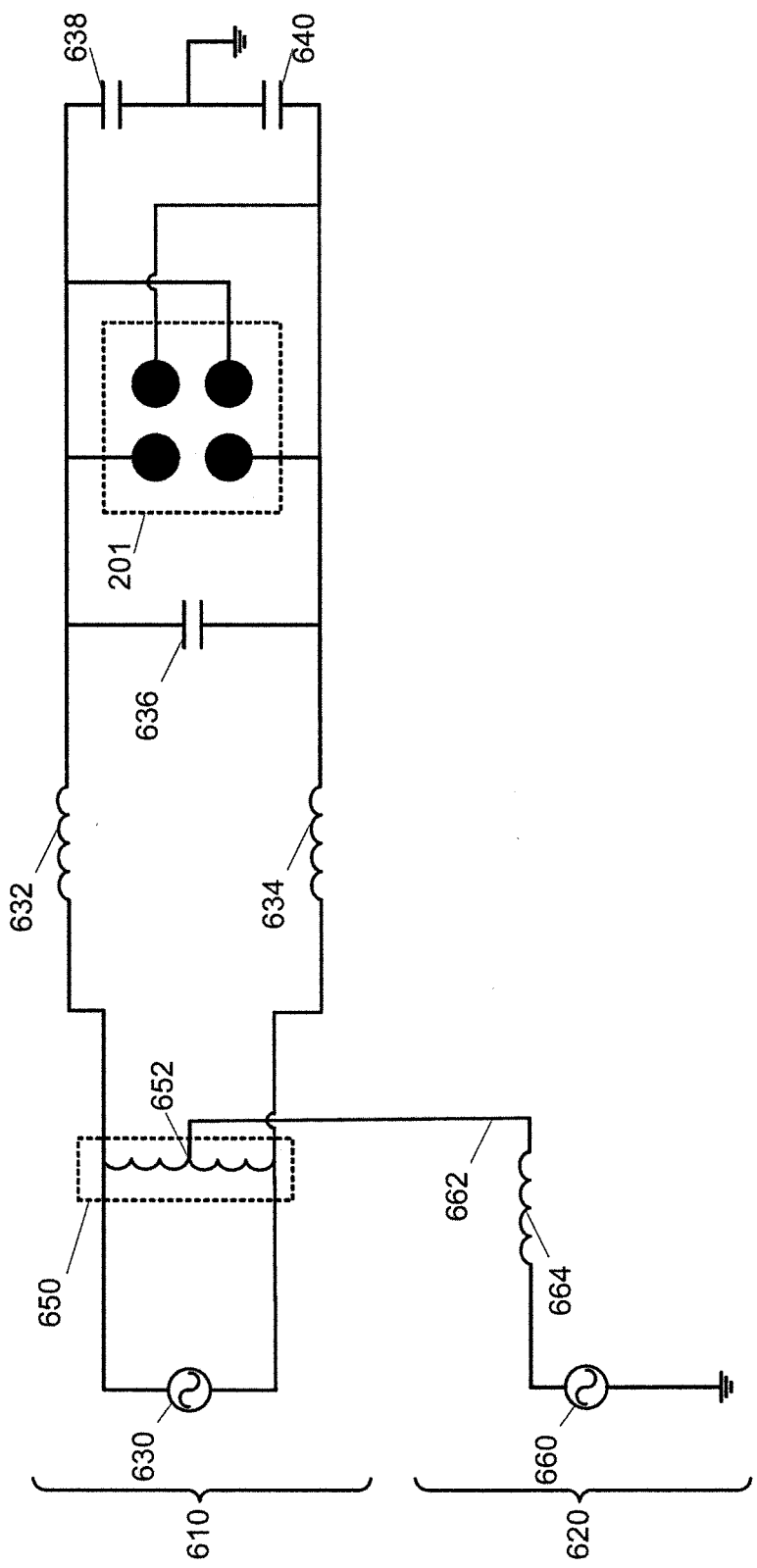
FIG. 6 depicts a schematic diagram of circuitry of an apparatus for coupling RF and AC signals to provide power to a quadrupole in a mass spectrometer, according to non-limiting embodiments.

While in embodiments depicted in FIGS. 2, 3, and 4, transformers 252 and TX4 comprise transformers having primary and secondary windings, other embodiments can comprise other suitable types of transformers. For example, attention is directed to FIG. 6, which is substantially similar to FIG. 2, with like elements having like numbers, except preceded by a "6" rather than a "2". For example, inductor 632 is substantially similar to inductor 232. However, transformer 650 comprises an autotransformer, with an output 662 of circuit 620 connected to a centre tap 652 of transformer 652, and outputs of power source 630 are connected to taps at the ends of the winding of the autotransformer.

Hence, circuits are provided for coupling RF and AC signals to provide power to quadrupole in mass spectrometer. These circuits can be used to control a quadrupole to eject ions in a desired sequence from the quadrupole, for example in order of m/z ratio starting with heavier ions, such that they arrive at a desired location in space simultaneously, for example at the extraction region of a ToF detector, and with the same kinetic energy. These circuits can also be used to control quadrupoles in applications that include but are not limited to mass selective axial ejection of ions from quadrupoles; filling ion traps (e.g. FT-ICR traps, Orbitraps; trapping of positive and negative ions simultaneously in a linear quadrupole ion trap utilizing AC barrier (that is polarity independent); and enhancement of a quadrupole using an RF/DC filter. However, such applications are merely to be considered exemplary and it is understood that such applications are non-limiting, and any other suitable application is within the scope of present embodiments.

Those skilled in the art will appreciate that in some embodiments, the functionality of apparatus 199 can be implemented using pre-programmed hardware or firmware elements (e.g., application specific integrated circuits (ASICs), electrically erasable programmable read-only memories (EEPROMs), etc.), or other related components. In other embodiments, the functionality of apparatus 199 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. An apparatus for coupling RF and AC signals to provide power to a multipole in a mass spectrometer, the apparatus comprising:
   a first circuit comprising:
   an RF power source for providing difference mode power to said multipole via said RF signal;
   at least one inductor for forming at least one resonant LC circuit with said multipole for providing voltage gain for said RF signal; and
   a transformer comprising a secondary tap, said transformer connected in parallel to said RF power source and further connected to said at least one inductor such that signals injected into said secondary tap are communicated to said at least one resonant LC circuit; and
   a second circuit comprising: an AC power source for providing common mode power to said multipole via said AC signal, an output from said second circuit connected to said secondary tap such that said common mode power is injected into said first circuit and said multipole can be operated in common mode and difference mode simultaneously; and at least one inductor for forming a resonant LC circuit with said multipole via said transformer, to provide voltage gain for said AC signal.

2. The apparatus of claim 1, further comprising at least one waveform generator circuit, connected to said first circuit, for controlling an amplitude of said RF signal.

3. The apparatus of claim 1, further comprising at least one waveform generator circuit, connected to said second circuit, for controlling an amplitude of said AC signal.

4. The apparatus of claim 1, wherein said second circuit further comprises at least one of: a transformer for providing voltage gain for said AC signal; and at least one further inductor for forming at least one resonant LC circuit with said multipole for providing voltage gain for said AC signal.

5. The apparatus of claim 1, wherein said transformer is enabled to provide further voltage gain for said RF signal.

6. The apparatus of claim 1, wherein said RF power sources operates in a range of 1-10 MHz.

7. The apparatus of claim 1, wherein said AC power sources operates in a range of 1-10 MHz.

8. The apparatus of claim 1, wherein each of said RF power source and said AC power source operates at substantially the same frequency.

9. The apparatus of claim 7, wherein each of said RF power source and said AC power source operates at substantially the same frequency and with a predefined phase difference, such that the addition of each said RF signal and said AC signal results in an RF unbalance on said multipole, that is controllable by varying said phase and amplitude of said AC signal.

10. The apparatus of claim 1, wherein said multipole comprises at least one of a quadrupole, hexapole and an octopole.

11. A method for coupling RF and AC signals to provide power to a multipole in a mass spectrometer, the method comprising:
    operating a first circuit to produce said RF signal, said first circuit comprising: an RF power source for providing difference mode power to said multipole via said RF signal; at least one inductor for forming at least one resonant LC circuit with said multipole for providing voltage gain for said RF signal; and a transformer, comprising a secondary tap, said transformer connected in parallel to said RF power source and further connected to said at least one inductor such that signals injected into said secondary tap are communicated to said at least one resonant LC circuit; and
    operating a second circuit to produce said AC signal, said second circuit comprising: an AC power source for providing common mode power to said multipole via said AC signal, an output from said second circuit connected to said secondary tap such that said common mode power is injected into said first circuit and said multipole can be operated in common mode and difference mode simultaneously; and at least one inductor for forming a resonant LC circuit with said multipole via said transformer, to provide voltage gain for said AC signal; and
    injecting said common mode power into said first circuit via said secondary tap to operate said multipole in common mode and difference mode simultaneously.

12. The method of claim 11, further comprising controlling an amplitude of said RF signal of said first circuit, via at least one waveform generator circuit.

13. The method of claim 11, further comprising controlling an amplitude of said AC signal of said second circuit, via at least one waveform generator circuit.

14. The method of claim 11, further comprising amplifying said AC signal via at least one of: a transformer in said second circuit; and at least one further inductor in said second circuit for forming at least one resonant LC circuit with said multipole.

15. The method of claim 11, further comprising providing further voltage gain for said RF signal using said transformer.

16. The method of claim 11, wherein said RF power sources operates in a range of 1-11 MHz.

17. The method of claim 11, wherein said AC power sources operates in a range of 1-11 MHz.

18. The method of claim 11, further comprising operating each of said RF power source and said AC power source at substantially the same frequency.

19. The method of claim 18, further comprising: operating each of said RF power source and said AC power at substantially the same frequency and with a predefined phase difference, such that the addition of each said RF signal and said AC signal results in an RF unbalance on said multipole, that is controllable by varying said phase and amplitude of said AC signal.

20. The method of claim 11, wherein said multipole comprises at least one of a quadrupole, hexapole and an octopole.

* * * * *